United States Patent
Sugihara

(10) Patent No.: US 10,356,355 B2
(45) Date of Patent: Jul. 16, 2019

(54) DISPLAY DEVICE AND METHOD FOR CONTROLLING DISPLAY DEVICE

(71) Applicant: KYOCERA Document Solutions Inc., Osaka (JP)

(72) Inventor: Hiroshi Sugihara, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/920,059

(22) Filed: Mar. 13, 2018

(65) Prior Publication Data

US 2018/0295314 A1    Oct. 11, 2018

(30) Foreign Application Priority Data

Apr. 5, 2017   (JP) ................. 2017-075228

(51) Int. Cl.
| | |
|---|---|
| H04N 5/445 | (2011.01) |
| H04N 1/00 | (2006.01) |
| G09B 5/02 | (2006.01) |
| H04N 5/232 | (2006.01) |

(52) U.S. Cl.
CPC .......... H04N 5/44504 (2013.01); G09B 5/02 (2013.01); H04N 1/00129 (2013.01); H04N 1/00251 (2013.01); H04N 1/00307 (2013.01); H04N 1/00477 (2013.01); H04N 5/23293 (2013.01); H04N 5/23296 (2013.01); H04N 2201/0094 (2013.01); H04N 2201/0098 (2013.01)

(58) Field of Classification Search
CPC .... G06F 3/1205; G06F 3/1253; G06F 3/1286; H04N 5/44504; H04N 1/00307; H04N 1/00477; G09B 5/02
See application file for complete search history.

(56) References Cited

U.S. PATENT DOCUMENTS

| | | | | |
|---|---|---|---|---|
| 2007/0274608 A1* | 11/2007 | Le Leannec | ............. | G06T 3/40 382/299 |
| 2009/0002342 A1* | 1/2009 | Terada | .................... | G06F 3/011 345/175 |
| 2009/0195659 A1* | 8/2009 | Nagata | ................ | G06F 3/03547 348/207.1 |
| 2014/0126018 A1* | 5/2014 | Sugimoto | ............... | G06F 3/013 358/1.15 |

FOREIGN PATENT DOCUMENTS

JP          2013-205425 A     10/2013

* cited by examiner

*Primary Examiner* — Ahmed A Berhan
(74) *Attorney, Agent, or Firm* — Stein IP, LLC

(57) ABSTRACT

A display device includes an imaging unit, a display unit, and a processing unit. The processing unit determines whether or not a subject to be operated is included in a captured image. When the subject to be operated is included in the captured image, the processing unit causes an additional image and the captured image to be displayed so that they are superimposed on each other. When displaying the additional image, the processing unit sets, in the captured image, a first region in which display of a human's hand is allowed and a second region in which display of the hand is not allowed. The processing unit allows a hand imaged into the first region to be displayed as it is and does not allow a hand imaged into the second region to be displayed.

15 Claims, 5 Drawing Sheets

FIG.3
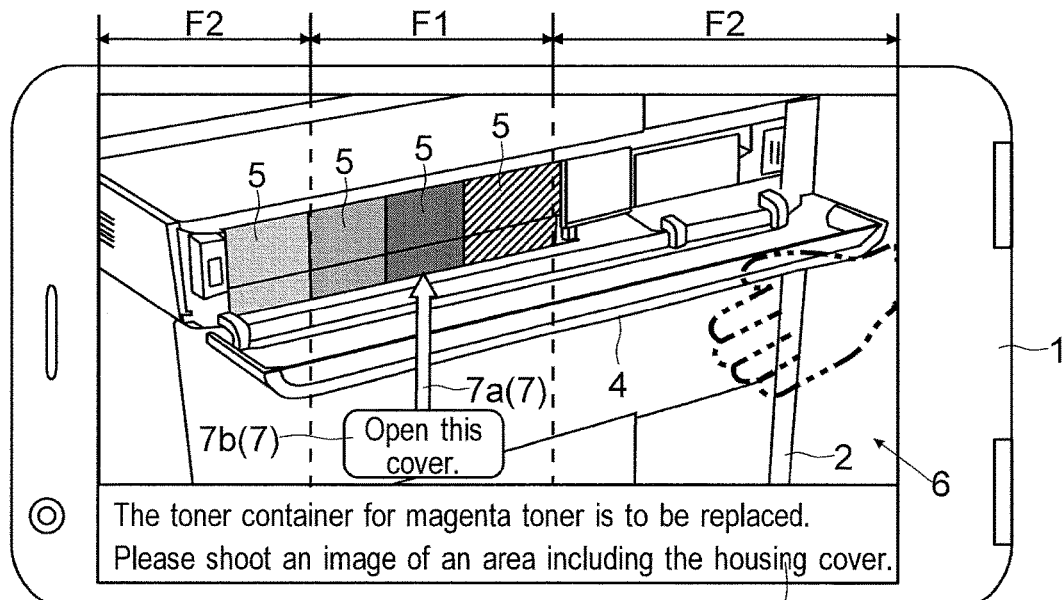
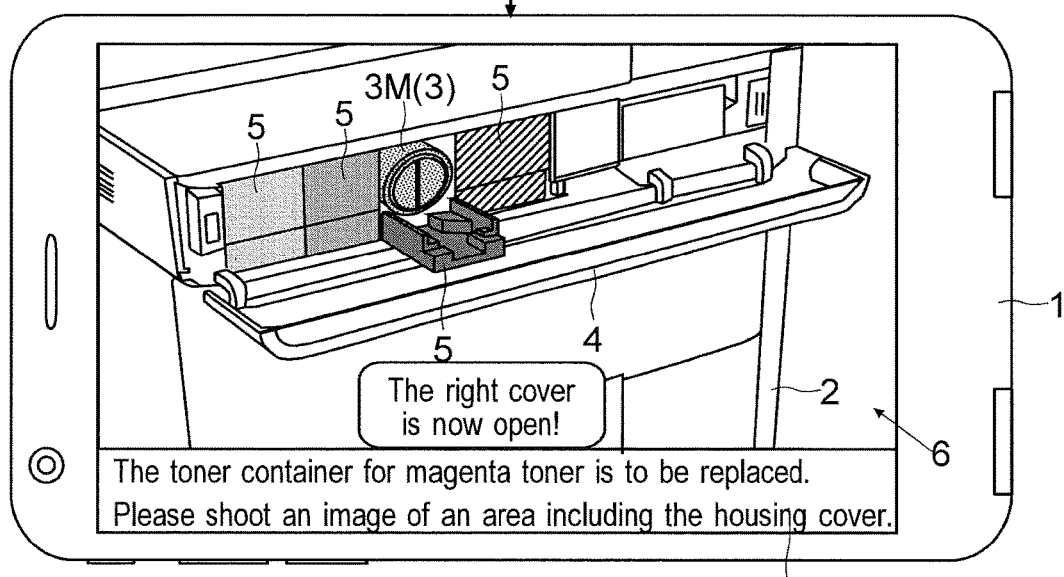

DISPLAY DEVICE AND METHOD FOR CONTROLLING DISPLAY DEVICE

INCORPORATION BY REFERENCE

This application is based upon and claims the benefit of priority from the corresponding Japanese Patent Application No. 2017-075228 filed on Apr. 5, 2017, the entire contents of which are incorporated herein by reference.

BACKGROUND

The present disclosure relates to a display device that displays a captured image obtained through imaging (by a camera) with another image superimposed thereon.

An actual captured image may be displayed with electronic information superimposed thereon. Such a technique may be referred to as augmented reality (AR). The augmented reality technique may be used to provide a user with guidance. For example, there is known a technique in which, on occurrence of a jam (a paper jam) in an image forming apparatus, guidance is provided on jam clearing work by use of augmented reality.

Specifically, there is known an image forming apparatus that has a conveyance path along which a paper sheet is conveyed, detects occurrence of a jam in the conveyance path, detects the paper sheet in the conveyance path, performs communication with a portable terminal device having an imaging function, predicts, on occurrence of a jam, a location where the jam has occurred based a result of detection by a detection sensor, provides the portable terminal device with image capturing guidance for capturing an image of the location thus predicted, obtains the image thus captured by the portable terminal device based on the image capturing guidance and analyzes the captured mage so as to determine a jam state, generates, based on a result of the determination, a guidance image for providing guidance on a jam clearing operation, and causes the captured image displayed on the portable terminal device to be displayed with the guidance image superimposed thereon.

When display based on augmented reality is performed, an actual captured image is displayed. Such display, therefore, is easily understandable to a user and thus is advantageous. The use of augmented reality may make it possible to display work guidance (work instructions) in an easy-to-understand manner. In displaying the work guidance, however, an image is captured so that a part to be operated is included therein. During work, an operator touches the part to be operated. Because of this, the operator's hand might be imaged into the captured image (a screen). Such imaging of an operator's hand into a captured image might interfere with the operator's understanding and thus is problematic.

SUMMARY

A display device according to the present disclosure includes an imaging unit, a display unit, and a processing unit. The display unit displays a captured image obtained through imaging by the imaging unit and a preset additional image so that the captured image and the additional image are superimposed on each other. The processing unit determines whether or not a subject to be operated in work, which is part of an image forming apparatus, is included in the captured image. When the subject to be operated is included in the captured image, the processing unit causes the additional image for providing guidance on the work to be displayed on the display unit. When causing the additional image to be displayed on the display unit, the processing unit sets, in the captured image, a first region in which display of a human's hand is allowed and a second region in which display of the hand is not allowed. The processing unit allows a hand imaged into the first region to be displayed as it is. The processing unit does not allow a hand imaged into the second region to be displayed.

A method for controlling a display device according to the present disclosure includes displaying a captured image obtained through imaging and a preset additional image so that the captured image and the additional image are superimposed on each other, determining whether or not a subject to be operated in work, which is part of an image forming apparatus, is included in the captured image, causing, when the subject to be operated is included in the captured image, the additional image for providing guidance on the work to be displayed, setting, when displaying the additional image, in the captured image, a first region in which display of a human's hand is allowed and a second region in which display of the hand is not allowed, allowing a hand imaged into the first region to be displayed as it is, and not allowing a hand imaged into the second region to be displayed.

Further features and advantages of the present disclosure will become apparent from the description of an embodiment given below.

BRIEF DESCRIPTION OF THE DRAWINGS

FIG. 3 is a view showing one example of how work guidance is displayed in the display device according to the embodiment.

DETAILED DESCRIPTION

The present disclosure is to enable easily viewable and easy-to-understand display of work guidance by eliminating unwanted imaging of a hand. With reference to FIG. 1 to FIG. 5, the following describes an embodiment of the present disclosure. In the following description, as an example, a portable display device is used as a display device 1. It should be noted, however, that various factors including a configuration, an arrangement, and so on described in this embodiment do not limit the scope of the disclosure thereto and are merely illustrative examples.

(Display Device 1)

Figure 1:
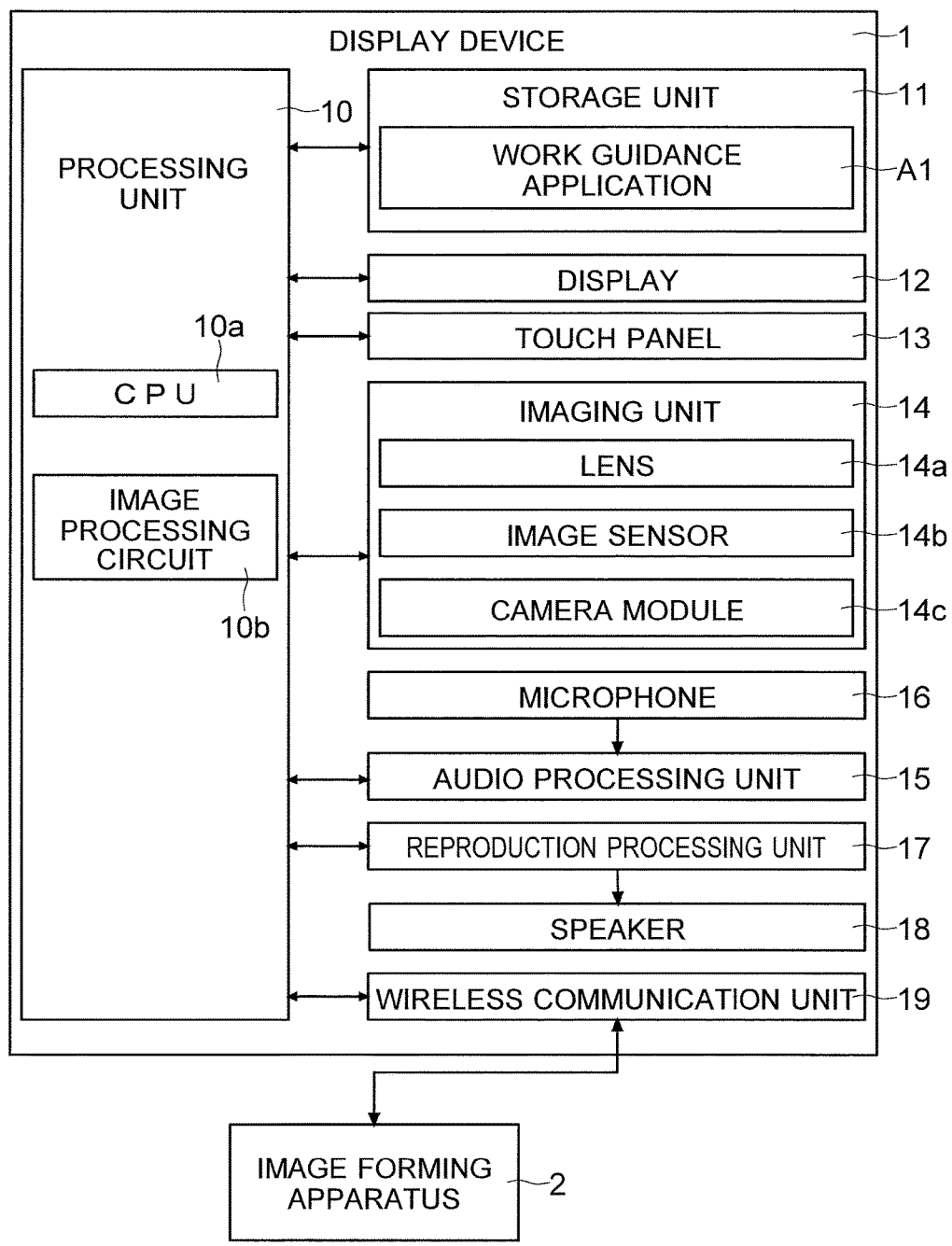
FIG. 1 is a view showing one example of a display device according to an embodiment.

With reference to FIG. 1, a description is given of one example of the display device 1 according to the embodiment. A smartphone can be used as the display device 1. The following describes an example in which a smartphone is used as the display device 1. The display device 1, however, is not limited to a smartphone. The display device 1 may be a tablet computer. Furthermore, the display device 1 may be a head-mounted display. Any type of display device that is portable and capable of augmented reality (AR) display applies to the display device 1 described herein.

The display device 1 includes a processing unit 10, a storage unit 11, a display 12 (corresponding to a display unit), a touch panel 13, an imaging unit 14, an audio processing unit 15, a microphone 16, a reproduction processing unit 17, a speaker 18, and a wireless communication unit 19.

The processing unit 10 is a circuit that controls an operation of the display device 1. The processing unit 10 includes a CPU 10a and an image processing circuit 10b. As the processing unit 10, an integrated circuit can be used that is formed by integrating the CPU 10a and the image processing circuit 10b into one chip. Based on an OS, programs, applications, and data in the display device 1, the processing unit 10 controls an operation of the display device 1. The image processing circuit 10b performs image processing with respect to image data.

The storage unit 11 includes a ROM, a RAM, and a flash memory. The storage unit 11 stores the OS, programs, applications, and data in the display device 1 in a non-volatile manner. In accordance with these contents thus stored in the storage unit 11, the processing unit 10 controls various units of the display device 1. In response to a user's request to start up an application made via the touch panel 13, the processing unit 10 reads the application from the storage unit 11 to the storage unit 11 and executes the application. The storage unit 11 stores a work guidance application A1. Based on the work guidance application A1, the processing unit 10 causes guidance on work to be displayed on the display 12, which is to be performed in the image forming apparatus 2.

In accordance with a request from the processing unit 10, the display 12 displays various types of information. The display 12 is a display panel such as a liquid crystal panel or an organic EL panel. The touch panel 13 is connected to the processing unit 10. Based on an output of the touch panel 13, the processing unit 10 recognizes a position that has been touched. The display 12 displays an operation image. Examples of the operation image include an icon, a button, a key, and a tab. Based on an output of the touch panel 13, the processing unit 10 recognizes which operation image has been operated (touched). By pressing the icon, the button, or the key, a user can start up and use an application or make a phone call.

The imaging unit 14 is a camera provided in the display device 1. The imaging unit 14 includes a lens 14a, an image sensor 14b, and a camera module 14c. Based on an image signal outputted by the image sensor 14b, the camera module 14c generates image data. A captured image 6 (image data) obtained through imaging by the imaging unit 14 is stored in the storage unit 11. The processing unit 10 can cause the captured image 6 to be displayed on the display 12. In a case of displaying the captured image 6 in a moving image manner, the processing unit 10 causes the imaging unit 14 to continuously generate the captured image 6. The processing unit 10 switches the captured image 6 used for display to a newly generated one.

The wireless communication unit 19 includes an antenna and a communication circuit. In accordance with a command from the processing unit 10, the wireless communication unit 19 can make access to a communication line provided by a communication carrier. External data transmission and reception and a phone conversation with the other party can be performed via the wireless communication unit 19. Furthermore, the wireless communication unit 19 can also wirelessly communicate with the image forming apparatus 2.

The audio processing unit 15 performs signal processing for converting audio inputted from the microphone 16 into data. The reproduction processing unit 17 causes the speaker 18 to reproduce sound (voice) data from the other party received in the wireless communication unit 19. Furthermore, the reproduction processing unit 17 can also cause the speaker 18 to reproduce sound data stored in the storage unit 11.

(Image Forming Apparatus 2)

Figure 2:
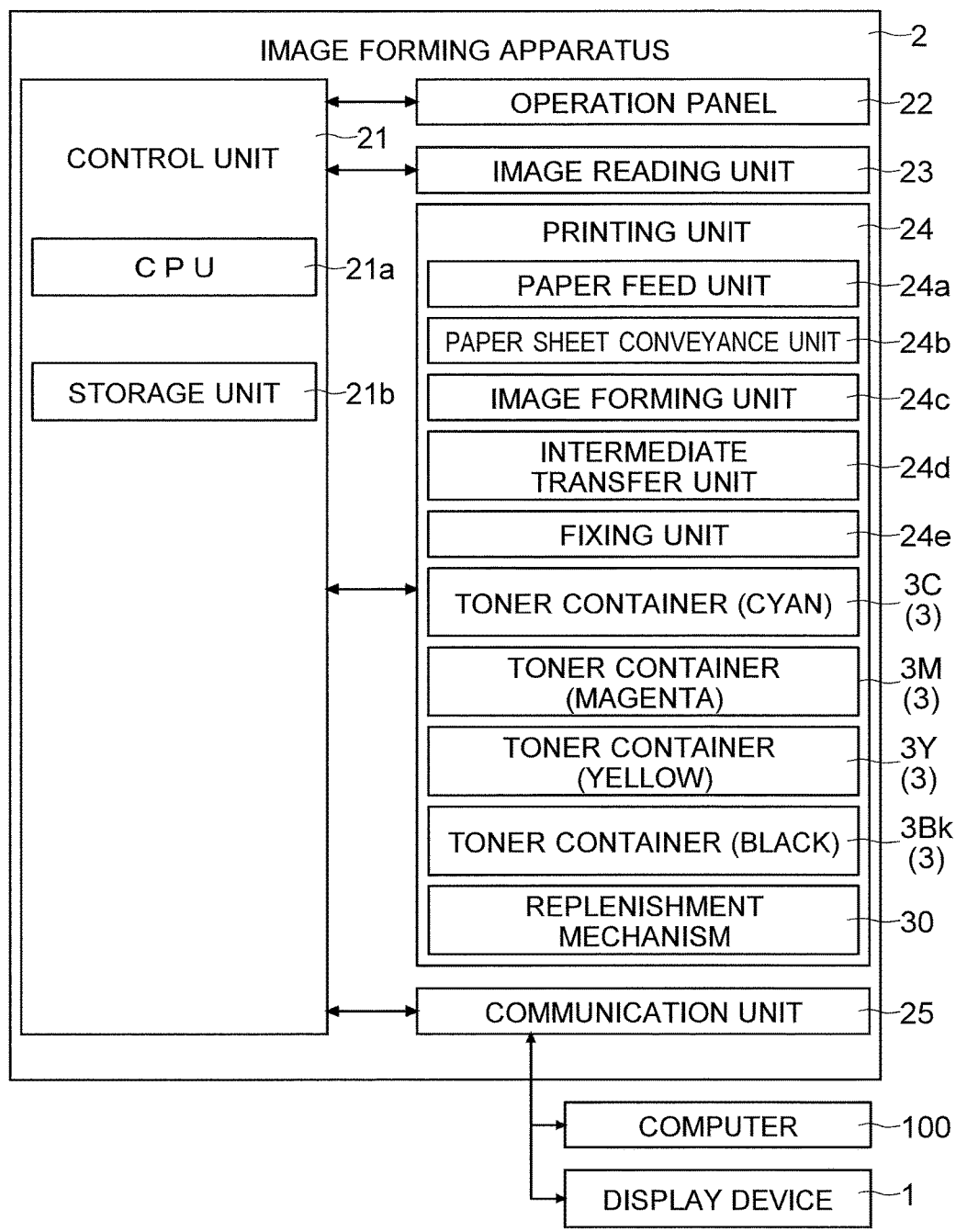
FIG. 2 is a view showing one example of an image forming apparatus according to the embodiment.

With reference to FIG. 2, a description is given of one example of an image forming apparatus 2 according to the embodiment. The image forming apparatus 2 shown in FIG. 2 is a multi-functional peripheral. The image forming apparatus 2 may be of any other type such as a printer or a copy machine. The image forming apparatus 2 includes a control unit 21, an operation panel 22, an image reading unit 23, a printing unit 24, and a communication unit 25.

The control unit 21 controls an operation of the image forming apparatus 2. The control unit 21 includes a CPU 21a and a storage unit 21b. The storage unit 21b is formed of a combination of storage devices such as a ROM, a RAM, an HDD, and so on. The storage unit 21b stores data, settings, and programs for controlling the image forming apparatus 2. Furthermore, the storage unit 11 can store image data. Based on the programs and data stored in the storage unit 21b, the CPU 21a controls the image forming apparatus 2.

In a case of a job of reading an original document (copying or transmission), the control unit 21 controls the image reading unit 23 to read the original document. The image reading unit 23 includes optical system members (not shown) such as an exposure lamp, a mirror, a lens, and a line sensor. The image reading unit 23 generates image data of the original document.

The operation panel 22 accepts a setting operation performed by a user. Based on a signal from the operation panel 22, the control unit 21 recognizes a setting made. Based on the setting made by the user, the control unit 21 controls the image reading unit 23, the printing unit 24, and the communication unit 25 to operate.

The printing unit 24 includes a paper feed unit 24a, a paper sheet conveyance unit 24b, an image forming unit 24c, an intermediate transfer unit 24d, and a fixing unit 24e. In a case of a job involving printing, the control unit 21 performs control so that a paper sheet placed in the paper feed unit 24a is fed. The control unit 21 controls the paper sheet conveyance unit 24b to convey the paper sheet along a conveyance path inside the image forming apparatus 2. The control unit 21 controls the image forming unit 24c to form a toner image based on image data of an image to be formed. The multi-functional peripheral is capable of color printing. In a case of color printing, the image forming unit 24c forms toner images of a plurality of colors by use of toner of the plurality of colors. Specifically, toner of four colors of cyan, magenta, yellow and black is used. The control unit 21 controls the intermediate transfer unit 24d to superimpose, on each other, the toner images of these colors formed in the image forming unit 24c and transfer a resulting toner image on a paper sheet. The toner image is transferred on the paper sheet being conveyed thereto. The control unit 21 controls the fixing unit 24e to fix the thus transferred toner image on the paper sheet.

As a result of printing, toner is consumed. In order to compensate for the thus consumed toner by replenishing the image forming unit 24c with a new supply of toner, a toner container 3 is mounted in the image forming apparatus 2. Specifically, there are mounted a toner container 3C for replenishing cyan toner, a toner container 3M for replenishing magenta toner, a toner container 3Y for replenishing yellow toner, and a toner container 3Bk for replenishing black toner. When emptied, the toner container 3 is replaced with a new one. A replenishment mechanism 30 conveys toner from the toner container 3 to the image forming unit 24c.

The communication unit 25 can wirelessly communicate with the wireless communication unit 19. Furthermore, the communication unit 25 can communicate with a computer 100 via a network. The communication unit 25 receives printing data transmitted from the display device 1 or the computer 100. The printing data is formed of image data or data described in the page description language. The control unit 21 controls the printing unit 24 to perform printing based on the printing data thus received (a print job).

(Display of Work Guidance)

Figure 4:
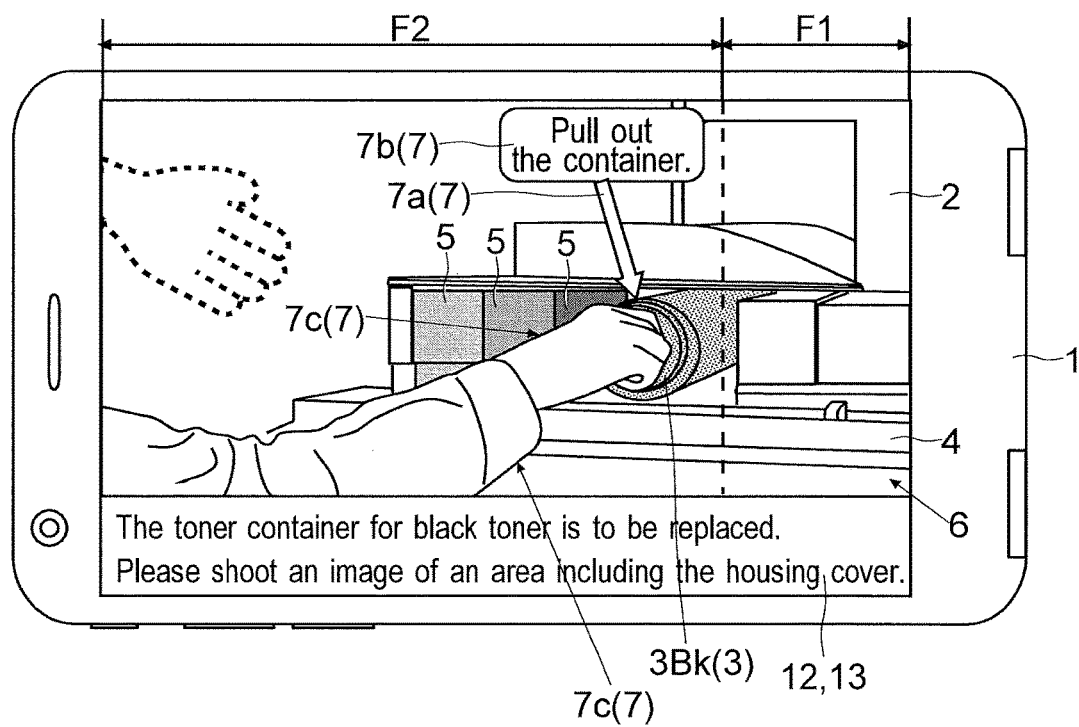
FIG. 4 is a view showing one example of how work guidance is displayed in the display device according to the embodiment.

Based on FIG. 3 and FIG. 4, a description is given of one example of display of work guidance in the display device 1 according to the embodiment. The display device 1 displays guidance on work related to the image forming apparatus 2. The work guidance can be displayed by starting up the work guidance application A1. Based on the work guidance application A1, in the display device 1, for example, guidance for replacing the toner container 3, replenishing paper sheets, and eliminating a paper jam can be displayed. Guidance on inspection work performed by a person in charge of maintenance (a serviceman) can also be displayed.

At the time of starting up the work guidance application A1, the processing unit 10 causes a work selection screen to be displayed on the display 12. The touch panel 13 accepts a selection of a type of work. The processing unit 10 recognizes the type of work thus selected. The processing unit 10 starts to display guidance on the selected type of work. The following describes, as an example, a case where work for replacing the toner container 3 has been selected.

First, the description is directed to work steps for replacing the toner container 3 in the image forming apparatus 2. The replacement work steps are roughly as follows:
(Work Step 1) Open a front cover 4 of the image forming apparatus 2.
(Work Step 2) Open a housing cover 5 corresponding to a to-be-replaced toner container 3.
(Work Step 3) Replace the to-be-replaced toner container 3.
(Work Step 4) Close the housing cover 5.
(Work Step 5) Close the front cover 4 (End).

(Regarding Work Step 1)

The image forming apparatus 2 is provided with the front cover 4. Opening the front cover 4 enables replacement of the toner container 3. The front cover 4 is openable forward to an angle of about 90 degrees (see FIG. 3).

(Regarding Work Step 2)

Four housing covers 5 are provided on an inner side of the front cover 4 (see FIG. 3). The housing covers 5 are intended to prevent the toner container 3 from being demounted (from coming off). The four housing covers 5 each correspond to the toner container 3 of a corresponding one of the four colors. In, FIG. 3, the toner container 3 for yellow toner is housed inside a leftmost one of the housing covers 5. The toner container 3 for cyan toner is housed inside a second one of the housing covers 5 from the left. The toner container 3 for magenta toner is housed inside a third one of the housing covers 5 from the left. The toner container 3 for black toner is housed inside a rightmost one of the housing covers 5. Moreover, each of the housing covers 5 has a color corresponding to the color of toner housed inside. In FIG. 3 and FIG. 4, in order from the left, the housing covers 5 have colors of yellow, cyan, magenta, and black, respectively. In work for replacing the toner container 3, it is required to open one of the housing covers 5 that has the same color as that of toner to be replaced. Consequently, the toner container 3 inside the one of the housing covers 5 is exposed.

(Regarding Work Step 3)

In replacement work, it is required to take out the toner container 3 inside the image forming apparatus 2 (on the inner side of an opened one of the housing covers 5). When taking it out, an operator pulls out the toner container 3 toward himself/herself (to a front side of the image forming apparatus 2). Thus, the toner container 3, which is bottle-shaped, is pulled out (see FIG. 4). After pulling out the toner container 3, which has been emptied, the operator inserts a new toner container 3 into the inner side of the opened one of the housing covers 5.

(Regarding Work Steps 4 and 5)

After completion of replacing the toner container 3, the operator closes the opened one of the housing covers 5 in an opened state. The new toner container 3 is then enclosed inside. After that, the front cover 4 is closed (work reverse to the work steps 1 and 2). Upon closure of the front cover 4, the work for replacing the toner container 3 is ended.

In a case of causing the display device 1 to display guidance on toner container replacing work, an operator touches an icon representing the work guidance application A1. On a screen displayed after start-up of the work guidance application A1, the operator selects the toner container replacing work. At the same time, the operator also selects a color of toner to be replaced. Upon selection of these, the processing unit 10 starts to display guidance on the toner container replacing work with respect to toner of the color thus selected.

The processing unit 10 causes work guidance using augmented reality (AR) to be displayed on the display 12. In a case of displaying the work guidance, the processing unit 10 causes the imaging unit 14 to operate. Then, at a preset cycle (intervals), the processing unit 10 causes the imaging unit 14 to generate the captured image 6. For example, the processing unit 10 causes a most recently generated captured image 6 to be displayed on the display 12. When the number of pixels of the display 12 is smaller than the number of pixels of the captured image 6, the processing unit 10 reduces the captured image 6. The processing unit 10 switches the captured image 6 used for display, one after another, from an old one to a new one. Thus, the captured image 6 actually being captured by the imaging unit 14 is displayed in a moving image manner on the display 12. An orientation and an angle of the imaging unit 14 are linked to the captured image 6 thus displayed.

The processing unit 10 determines whether or not a subject to be operated in work, which is part of the image forming apparatus 2, is included in the captured image 6. A subject to be operated varies depending on a work step. In a case of replacing the toner container 3, a subject to be operated changes depending on a work step. Specifically, a subject to be operated sequentially changes in the following order: the front cover 4 (Work Step 1)→the housing cover 5 (Work Step 2)→the toner container 3 (Work Step 3)→the housing cover 5 (Work Step 4)→the front cover 4 (Work Step 5).

The processing unit 10 (the image processing circuit 10b) performs an analysis on the captured image 6. The processing unit 10 recognizes objects included in the captured image 6. For example, the processing unit 10 recognizes the front cover 4. Furthermore, the processing unit 10 recognizes four quadrangles arranged in the order of yellow, cyan, magenta, and black as a row of the housing covers 5. The processing unit 10 recognizes a yellow-colored one of the thus arranged four quadrangles as one of the housing covers 5 that corresponds to the toner container 3 for yellow toner. The processing unit 10 recognizes a cyan-colored one of the four quadrangles as one of the housing covers 5 that corresponds to the toner container 3 for cyan toner. The processing unit 10 recognizes a magenta-colored one of the four quadrangles as one of the housing covers 5 that corresponds to the toner container 3 for magenta toner. The processing unit 10 recognizes a black-colored one of the four quadrangles as one of the housing covers 5 that corresponds to the toner container 3 for black toner. As shown in FIG. 3 and FIG. 4, the toner container 3 has a circular handle attached thereto. The processing unit 10 recognizes, as the toner container 3, a cylinder of a particular color in the captured image 6, which has the same shape as that of a handle part of the toner container 3.

Based on a result of the analysis on the captured image 6, the processing unit 10 determines whether or not a subject to be operated in a current work step is included in the captured image 6. For example, in Work Step 1, when the front cover 4 is included in the captured image 6, the processing unit 10 determines that a subject to be operated is included in the captured image 6. In Work Step 2, when the housing cover 5 is included in the captured image 6, the processing unit 10 determines that a subject to be operated is included in the captured image 6. In Work Step 3, when the toner container 3 is included in the captured image 6, the processing unit 10 determines that a subject to be operated is included in the captured image 6.

In order to facilitate determining whether or not a subject to be operated in a current work step is included in the captured image 6, each subject to be operated may be marked beforehand with an AR marker. For example, the front cover 4, the housing cover 5, and the toner container 3 may be marked with different AR markers, respectively. Without any limitation, an AR marker may be applied by affixing a label, painting, printing, or the like. A pattern of an AR marker may vary depending on a subject to be operated. An AR marker is a graphic having a prescribed pattern. When an AR marker corresponding to a subject to be operated is not included in the captured image 6, the processing unit 10 may determine that the subject to be operated is not included in the captured image 6. When an AR marker corresponding to a subject to be operated is included in the captured image 6, the processing unit 10 may determine that the subject to be operated is included in the captured image 6.

FIG. 3 shows an example of how work guidance is displayed at the time of replacing the toner container 3 for magenta toner. FIG. 3 shows one example of work guidance corresponding to Work Step 2. The front cover 4 of the image forming apparatus 2 has already been opened (Work Step 1 has been completed). An upper diagram of FIG. 3 shows a state before the housing cover 5 is opened. A lower diagram of FIG. 3 shows a state after the housing cover 5 has been opened.

As shown in the upper diagram of FIG. 3, the processing unit 10 may cause an arrow 7a to be displayed on the display 12 as an additional image 7. The arrow 7a points to a subject to be operated in a current work step. The processing unit 10 may cause the arrow 7a to be displayed in a blinking manner. Furthermore, the operation unit 10 may cause the arrow 7a to vary in length in an animated manner so as to expand or contract toward a part to be operated.

When a subject to be operated is included in the captured image 6, the processing unit 10 causes the additional image 7 for providing guidance on work to be displayed on the display unit. Moreover, the processing unit 10 causes the captured image 6 obtained through imaging by the imaging unit 14 to be displayed with the additional image 7 superimposed thereon. Furthermore, as shown in the upper diagram of FIG. 3, the processing unit 10 may cause a character box 7b including operation instructions to be displayed as the additional image 7. The processing unit 10 specifies, in the character box 7b, a subject to be operated and an operation to be performed.

The lower diagram of FIG. 3 shows an example of display after Work Step 2 has been ended. The processing unit 10 recognizes that a subject to be operated has been operated. In other words, the processing unit 10 recognizes that a current work step has been ended. For example, when an analysis on the captured image 6 finds that the toner container 3 has appeared (has become included) in the captured image 6, the processing unit 10 determines that Work Step 2 has been ended. Furthermore, when an AR marker corresponding to the toner container 3 has appeared in the captured image 6, the processing unit 10 may determine that Work Step 2 has been ended. In this manner, based on the captured image 6, the processing unit 10 determines whether or not a current work step has been ended. Then, the processing unit 10 recognizes a subject to be operated in a next work step.

FIG. 4 shows an example of how work guidance is displayed at the time of replacing the toner container 3 for black toner. FIG. 4 shows one example of work guidance corresponding to Work Step 3. Work Steps 1 and 2 have been completed. At the time of providing work guidance corresponding to Work Step 3 (pulling-out/insertion of the toner container 3), the processing unit 10 causes a moving image-like additional image 7c to be displayed as the additional image 7. In FIG. 4, a hand (an arm) is shown as the moving image-like additional image 7c. Specifically, as the moving image-like additional image 7c, the processing unit 10 causes an image of a hand to be displayed on the display 12, which changes in such a manner that the hand reaches out for the toner container 3, grabs the toner container 3, and pulls out the toner container 3. In other words, the processing unit 10 causes the additional image 7 simulating a hand (an arm) to be animated. Furthermore, as shown in FIG. 4, as the additional image 7, the processing unit 10 may cause the arrow 7a pointing at a subject to be operated to be displayed on the display 12. Furthermore, as the additional image 7, the processing unit 10 may cause the character box 7b including operation instructions to be displayed on the display 12.

When the toner container 3 in the captured image 6 has once disappeared therefrom and then is shown to be mounted therein, the processing unit 10 recognizes that Work Step 3 has been ended. For example, when, by an image analysis, it can be recognized that the toner container 3 has been demounted and then a new toner container 3 is installed next to or between the housing covers 5, the processing unit 10 determines that Work Step 3 has been ended. Furthermore, when an AR marker corresponding to the toner container 3 has once disappeared and then is positioned next to or between AR markers corresponding to the housing covers 5, the processing unit 10 may determine that Work Step 3 has been ended.

As for Work Step 4, when, in the captured image 6, the toner container 3 has disappeared and one of the housing covers 5 that has the same color as that of toner replaced appears, the processing unit 10 determines that Work Step 4 has been ended. Furthermore, when an AR marker corresponding to the toner container 3 has disappeared and an AR marker corresponding to one of the housing covers 5 that has the same color as that of toner replaced appears, the processing unit 10 may determine that Work Step 4 has been ended.

As for Work Step 5, for example, when, in the captured image 6, the housing covers 5 have disappeared and a front surface of the front cover 4 appears, the processing unit 10 may determine that Work Step 5 has been ended. Furthermore, when AR markers corresponding to the housing covers 5 have disappeared and an AR marker provided on the front surface of the front cover 4 appears, the processing unit 10 may determine that Work Step 5 has been ended.

(Flow of Display of Work Guidance)

Figure 5:
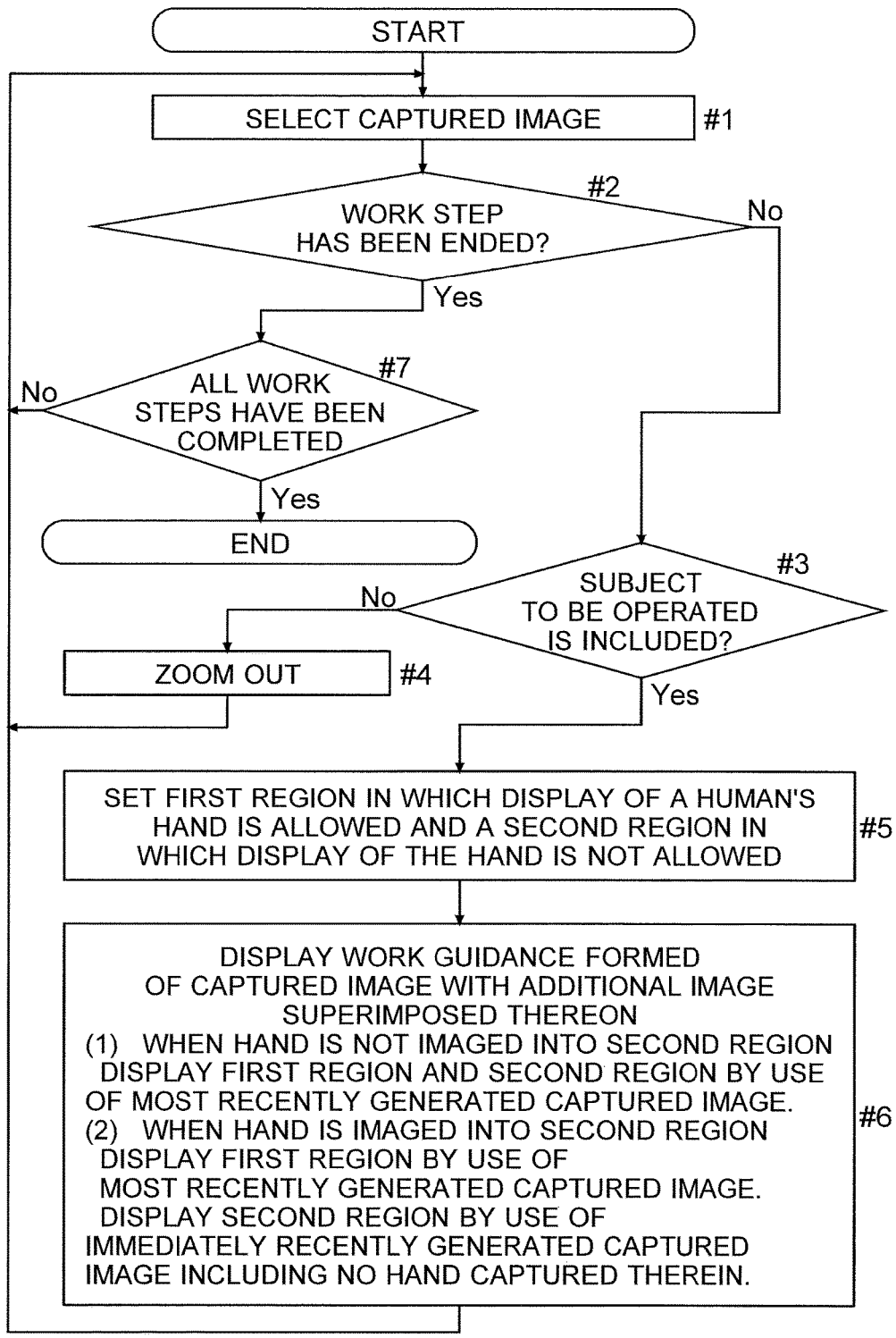
FIG. 5 is a flow chart showing one example of a flow for displaying work guidance in the display device according to the embodiment.

Next, with reference to FIG. 3, FIG. 4, and FIG. 5, a description is given of one example of a flow of display of work guidance in the display device 1 according to the embodiment. The captured image 6 is used to provide work guidance. An operator's hand (arm) might become present within an imaging range of the imaging unit 14. The hand thus imaged might interfere with the work guidance. For example, because of this, understanding of work details might be impaired. Or view of the additional image 7 might be impaired. As a solution to this, the display device 1 displays work guidance while eliminating unwanted imaging of a hand.

"START" in FIG. 5 is a start point in time of displaying work guidance. This refers to a point in time when the touch panel 13 has accepted start-up of the work guidance application A1 and a selection of a type of work guidance to be displayed.

First, the processing unit 10 selects, among the captured images 6 being continuously generated, one captured image 6 to be used for work guidance (Step #1). The processing unit 10 selects one of a plurality of captured images 6 as a captured image 6 to be used for work guidance. Steps described below may be executed with respect to each of the captured images 6. Furthermore, the following steps may be executed every time a prescribed number of captured images 6 have been obtained. Until it can be determined that the last work step has been completed, the processing unit 10 repeatedly executes the steps in a flow chart of FIG. 5.

Based on the thus selected captured image 6, the processing unit 10 checks whether or not it can be recognized that a current work step has been ended (Step #2). At the very start of this flow, "No" is given at Step #2. When it cannot be recognized that the work step has been ended ("No" at Step #2), the processing unit 10 checks whether or not a subject to be operated in the current work step is included in the selected captured image 6 (Step #3). When the subject to be operated in the current work step is not included ("No" at Step #3), the processing unit 10 causes the imaging unit 14 to zoom out (Step #4). This makes it likely that the subject to be operated become present within an image capturing range of the imaging unit 14. The flow returns to Step #1.

The image forming apparatus 2 (the control unit 21) may determine whether or not to zoom out. In this case, the processing unit 10 causes the wireless communication unit 19 to transmit the selected captured image 6 toward the communication unit 25. The control unit 21 checks whether or not a subject to be operated in a current work step is included in the selected captured image 6. When the subject to be operated in the current work step is not included, the control unit 21 controls the communication unit 25 to transmit a zoon-out command toward the wireless communication unit 19. Upon receiving the zoom-out command, the processing unit 10 causes the imaging unit 14 to zoom out.

When the subject to be operated in the current work step is included ("Yes" at Step #3), the processing unit 10 sets, in a most recently generated one of the captured images 6, a first region F1 in which display of a human's hand is allowed and a second region F2 in which display of the hand is not allowed (Step #5). The processing unit 10 allows a hand imaged into the first region F1 to be displayed as it is. Because of this, a region that would not affect guidance even when a hand is imaged thereinto is set as the first region F1 The processing unit 10 does not allow a hand imaged into the second region F2 to be displayed. Because of this, a region that might impair understanding of guidance when a hand is imaged thereinto is set as the second region F2.

Then, the processing unit 10 causes work guidance to be displayed on the display 12, which is formed of the most recently generated captured image 6 with the additional image 7 superimposed thereon (Step #6). After Step #6, the flow returns to Step #1.

(1) When no hand is imaged into the second region F2

By use of the selected captured image 6, the processing unit 10 causes the first region F1 and the second region F2 to be displayed on the display 12.

(2) When a Hand is Imaged into the Second Region F2

By use of the selected captured image 6, the processing unit 10 causes the first region F1 to be displayed on the display 12. By use of an immediately recently generated one of captured images 6 including no hand captured therein, the processing unit 10 causes the second region F2 to be displayed on the display 12. That is, when a hand is imaged into the second region F2, the processing unit 10 generates a synthetic image formed by integrating first image data with second image data. The first image data is obtained by clipping an area corresponding to the first region F1 from the selected captured image 6, and the second image data is obtained by clipping an area corresponding to the second region F2 from the immediately recently generated captured image 6 including no hand captured therein. The processing unit 10 causes an image to be displayed on the display 12, which is formed of the synthetic image with the additional image 7 superimposed thereon. In the upper diagram of FIG. 3, one example of a hand that had been imaged thereinto and has then been erased is shown by a chain double-dashed line.

Regarding Step #6, the processing unit 10 (the image processing circuit 10*b*) determines whether or not a hand is included in the captured image 6. Determination data (an algorithm) used to determine whether or not a hand is included is stored in the storage unit 11. Based on the determination data, the processing unit 10 determines whether or not a hand is included.

When work guidance is being displayed, an operator is directing the imaging unit 14 toward the image forming apparatus 2. Unless a hand is imaged into the captured image 6, a skin-color pixel should not be included therein. A pixel value regarded as indicating a skin color is preset. Based on this, the processing unit 10 determines whether or not a pixel having a pixel value indicating a skin color is present in the captured image 6. When there is no pixel having the pixel value indicating the skin color, the processing unit 10 determines that no hand is included in the captured image 6. When there is a pixel having the pixel value indicating the skin color, the processing unit 10 determines that a hand is included in the captured image 6.

Presence/absence of a hand may be determined with more accuracy. For example, when there is a pixel having the pixel value indicating the skin color, the processing unit 10 extracts a region having the pixel value indicating the skin color (a skin-color region) in each of a plurality of captured images 6. The captured images 6 used in this case are those obtained from a prescribed time period ago to a current point in time. The prescribed time period is set as appropriate. For example, the prescribed time period can be set to several hundreds of milliseconds to about 1 second. The processing unit 10 may determine a moving distance a center position of the skin-color region has moved within the prescribed time period. That is, attention is focused on a fact that a hand is moved toward a subject to be operated. When the moving distance is not less than a threshold value, the processing unit 10 determines that a hand is included. When the moving distance is less than the threshold value, there is a high possibility that some object having the skin color has been imaged into the captured image 6. Based on this, when the moving distance is less than the threshold value, the processing unit 10 determines that no hand is included.

Next, with reference to FIG. 3, a description is given of an example of setting the first region F1 and the second region F2 in a case of Work Step 2. The processing unit 10 sets, as the first region F1, a region in the captured image 6, which includes a subject to be operated in a current work step (the housing cover 5). On the other hand, the processing unit 10 sets a region outside the first region F1 as the second region F2.

In displaying guidance, the processing unit 10 causes a broken line to be displayed on the display 12. The broken line indicates a boundary between the first region F1 and the second region F2. The boundary can be formed of a straight line splitting the captured image 6 in an up-down direction. As shown in FIG. 3 (the upper diagram), the processing unit 10 sets, as the first region F1, a region including the magenta-colored housing cover 5. For example, the processing unit 10 sets, as the first region F1, a region having a prescribed width in a left-right direction, which includes a subject to be operated. In an example shown in FIG. 3 (the upper diagram), a region interposed between two broken lines is set as the first region F1. Further, each of regions outside the first region F1 is set as the second region F2.

In displaying guidance for Work Step 2, when a hand has approached one of the housing covers 5 that is to be operated, the hand is displayed. When the hand is positioned within the second region F2, far away from the one of the housing covers 5 that is to be operated, the hand is not displayed.

The processing unit 10, however, may set, as the second region F2, a subject to be operated in a next work step in the first region F1. In the example shown in FIG. 3 (the upper diagram), the processing unit 10 may set, as the second region F2, an area including the toner container 3 in the first region F1. This is intended to prevent the subject to be operated in the next work step from being hidden.

Next, with reference to FIG. 4, a description is given of an example of setting the first region F1 and the second region F2 in a case of Work Step 3. The processing unit 10 sets, as the second region F2, a region in the captured image 6, which includes a subject to be operated in a current work step (the toner container 3). On the other hand, the processing unit 10 sets a region outside the second region F2 as the first region F1. This setting is opposite to the setting in Work Step 2.

Also in Work Step 3, a broken line is displayed on the display 12. Also in an example shown in FIG. 4, the broken line indicates a boundary between the first region F1 and the second region F2. In the example shown in FIG. 4, a single broken line is displayed. In Work Step 3, the additional image 7 is displayed in a moving image manner (an animated manner), showing a state where the toner container 3 is pulled out/inserted with a hand (the moving image-like additional image 7c). When an operator's hand is imaged into such a moving image, view might often be impaired. As a solution to this, in work guidance for Work Step 3, the processing unit 10 sets the second region F2 so that a region for displaying the moving image-like additional image 7c is included therein. For example, the processing unit 10 sets, as the second region F2, an inner area of a region for displaying the moving image-like additional image 7c. The processing unit 10 sets, as the first region F1, a region for not displaying the moving image-like additional image 7c. As a result, in displaying guidance for Work Step 3, when a hand has approached a region for displaying the moving image-like additional image 7c (the toner container 3), the hand is no longer displayed. When the hand is positioned far away from the region for displaying the moving image-like additional image 7c (the toner container 3), the hand is displayed.

On the other hand, the processing unit 10 sets, as the first region F1, a region for not displaying the additional image 7 in the captured image 6. In other words, the processing unit 10 sets a region outside the second region F2 as the first region F1. In the example shown in FIG. 4, a region on the left of the broken line is set as the second region F2. Further, a region on the right of the broken like is set as the first region F1.

When it is recognized that a current work step has been ended ("Yes" at Step #2), the processing unit 10 checks whether or not all work steps have been completed (Step #7). When not all the work steps have been completed ("No" at Step #7), the flow returns to Step #1. When all the work steps have been completed ("Yes" at Step #7), there is no work guidance to be displayed. This ends the flow ("END").

As described above, the display device 1 according to this embodiment includes the imaging unit 14, the display unit (the display 12), and the processing unit 10. The display unit displays the captured image 6 obtained through imaging by the imaging unit 14 and the preset additional image 7 so that the captured image 6 and the additional image 7 are superimposed to each other. The processing unit 10 determines whether or not a subject to be operated in work, which is part of the image forming apparatus 2, is included in the captured image 6. When the subject to be operated is included in the captured image 6, the processing unit 10 causes the additional image 7 for providing guidance on the work to be displayed on the display unit. When causing the additional image 7 to be displayed on the display unit, the processing unit 10 sets, in the captured image 6, the first region F1 in which display of a human's hand is allowed and the second region F2 in which display of the hand is not allowed. The processing unit 10 allows a hand imaged into the first region F1 to be displayed as it is. The processing unit 10 does not allow a hand imaged into the second region F2 to be displayed.

With this configuration, in the second region F2, unwanted imaging of an operator's hand can be eliminated. Even when a hand becomes present within an image capturing range of the imaging unit 14 (a camera), an image including no hand imaged therein can be displayed. Thus, work guidance formed of the additional image 7 and the captured image 6 superimposed on each other can be made easily viewable. Work guidance easily understandable to an operator can be displayed.

Furthermore, the processing unit 10 sets, as the first region F1, a region in the captured image 6, which includes a subject to be operated in a current work step, and sets a region outside the first region F1 as the second region F2. With this configuration, when a hand has approached a part to be operated in work, the operator's hand is displayed. On the other hand, in a part not required to be operated from the viewpoint of a work step, an operator's hand is not displayed. Thus, an operator can easily know a position of a part to be operated.

Furthermore, the processing unit 10 sets, as the second region F2, a subject to be operated in a next work step in the first region F1. With this configuration, it is possible to prevent a part to be operated in a next work step from being hidden by a hand. Furthermore, a hand disappears in a part to be operated in a next work step. An operator, therefore, can intuitively recognize a part to be operated next.

Furthermore, the processing unit 10 causes the additional image 7 to be displayed within the first region F1. With this configuration, the additional image 7 can be displayed so as to be associated with a subject to be operated.

Furthermore, when displaying the moving image-like additional image 7c, the processing unit 10 sets the second region F2 so that a region for displaying the moving image-like additional image 7c in the captured image 6 is included therein, and sets, as the first region F1, a region for not displaying the moving image-like additional image 7c. With this configuration, it is possible to prevent imaging of an operator's hand from interfering with work guidance using a moving image. In a case where displaying the additional image 7 on a priority basis further facilitates understanding, a configuration is possible in which display of a hand near the additional image 7 is not allowed. For example, in a case where the moving image-like additional image 7c represents a hand, it is possible to prevent confusion between an operator's hand and the hand represented by the moving image-like additional image 7c. Furthermore, when a hand has approached a part to be operated in work, the user's hand is no longer displayed. On the other hand, in a part not required to be operated from the viewpoint of a work step, an operator's hand is displayed. Thus, based on whether or not a hand is displayed, a position of a part to be operated can be known.

Furthermore, there is included the storage unit 11 that stores the captured image 6. When a hand is imaged into the second region F2, by use of a captured image 6 selected to be used for display, the processing unit 10 causes the first region F1 to be displayed on the display unit, and as for the second region F2, by use of an immediately recently generated one of captured images 6 including no hand captured therein, the processing unit 10 causes the second region F2 to be displayed on the display unit. With this configuration, a captured image 6 in which no hand is imaged into the second region F2 can be easily displayed.

Furthermore, when a subject to be operated is not included in the captured image 6, the processing unit 10 causes the imaging unit 14 to zoom out. This can make it likely that a subject to be operated falls within an imaging range.

The present disclosure can also be considered as providing a display system provided with the display device 1 and the image forming apparatus 2 including a subject to be operated.

Furthermore, while the foregoing has described the embodiment of the present disclosure, the scope of the present disclosure is not limited thereto, and the present disclosure can be implemented by adding various modifications thereto without departing from the spirit of the disclosure.

What is claimed is:

1. A display device, comprising:
an imaging unit;
a display unit that displays a captured image obtained through imaging by the imaging unit and a preset additional image so that the captured image and the additional image are superimposed on each other; and
a processing unit that determines whether or not a subject to be operated in work, which is part of an image forming apparatus, is included in the captured image, when the subject to be operated is included in the captured image, causes the additional image for providing guidance on the work to be displayed on the display unit, when causing the additional image to be displayed on the display unit, sets, in the captured image, a first region in which display of a human's hand is allowed and a second region in which display of the hand is not allowed, allows a hand imaged into the first region to be displayed as it is, and does not allow a hand imaged into the second region to be displayed;
wherein when displaying a moving image as the additional image, the processing unit sets the second region so that a region for displaying the moving image as the additional image in the captured image is included therein, and sets, as the first region, a region for not displaying the moving image as the additional image.

2. The display device according to claim 1, wherein
the processing unit sets, as the first region, a region in the captured image, which includes the subject to be operated in a current work step, and sets a region outside the first region as the second region.

3. The display device according to claim 2, wherein
the processing unit sets, as the second region, the subject to be operated in a next work step in the first region.

4. The display device according to claim 2, wherein
the processing unit causes the additional image to be displayed within the first region.

5. The display device according to claim 1, wherein
when the subject to be operated is not included in the captured image, the processing unit causes the imaging unit to zoom out.

6. The display device according to claim 1, wherein
the processing unit causes an arrow, as the additional image, which points to the subject to be operated in a current work step and a character box, as the additional image, which includes operation instructions, to be displayed on the display unit.

7. The display device according to claim 1, wherein
when displaying guidance on work for replacing a toner container, the processing unit causes an image to be displayed on the display unit, which is formed by superimposing on each other the captured image and the additional image for providing guidance on the work for replacing the toner container.

8. A display device, comprising:
an imaging unit;
a display unit that displays a captured image obtained through imaging by the imaging unit and a preset additional image so that the captured image and the additional image are superimposed on each other;
a processing unit that determines whether or not a subject to be operated in work, which is part of an image forming apparatus, is included in the captured image, when the subject to be operated is included in the captured image, causes the additional image for providing guidance on the work to be displayed on the display unit, when causing the additional image to be displayed on the display unit, sets, in the captured image, a first region in which display of a human's hand is allowed and a second region in which display of the hand is not allowed, allows a hand imaged into the first region to be displayed as it is, and does not allow a hand imaged into the second region to be displayed; and a storage unit that stores the captured image, wherein when a hand is imaged into the second region, by use of, as the captured image, an image selected to be used for display, the processing unit causes the first region to be displayed on the display unit, and by use of an immediately recently generated one of images, as the captured images, which include no hand captured therein, the processing unit causes the second region to be displayed on the display unit.

9. The display device according to claim 8, wherein
the processing unit sets, as the first region, a region in the captured image, which includes the subject to be operated in a current work step, and sets a region outside the first region as the second region.

10. The display device according to claim 9, wherein
the processing unit sets, as the second region, the subject to be operated in a next work step in the first region.

11. The display device according to claim 9, wherein
the processing unit causes the additional image to be displayed within the first region.

12. The display device according to claim 8, wherein
when the subject to be operated is not included in the captured image, the processing unit causes the imaging unit to zoom out.

13. The display device according to claim 8, wherein
the processing unit causes an arrow, as the additional image, which points to the subject to be operated in a current work step and a character box, as the additional image, which includes operation instructions, to be displayed on the display unit.

14. The display device according to claim 8, wherein
when displaying guidance on work for replacing a toner container, the processing unit causes an image to be displayed on the display unit, which is formed by superimposing on each other the captured image and the additional image for providing guidance on the work for replacing the toner container.

15. A method for controlling a display device, comprising:

displaying a captured image obtained through imaging and a preset additional image so that the captured image and the additional image are superimposed on each other;

determining whether or not a subject to be operated in work, which is part of an image forming apparatus, is included in the captured image;

causing, when the subject to be operated is included in the captured image, the additional image for providing guidance on the work to be displayed;

setting, when displaying the additional image, in the captured image, a first region in which display of a human's hand is allowed and a second region in which display of the hand is not allowed;

allowing a hand imaged into the first region to be displayed as it is;

not allowing a hand imaged into the second region to be displayed;

storing the captured image;

displaying the first region when a hand is imaged into the second region, by use of, as the captured image, an image selected to be used for display; and displaying the second region by use of an immediately recently generated one of images, as the captured images, which include no hand captured therein.

* * * * *